United States Patent [19]

Danhof

[11] 4,422,815
[45] Dec. 27, 1983

[54] MACHINE TOOL SUPPORT AND DISCHARGE APPARATUS

[75] Inventor: Bernard Danhof, Bellevue, Wash.

[73] Assignee: Western Automation Corporation, Redmond, Wash.

[21] Appl. No.: 336,635

[22] Filed: Jan. 4, 1982

[51] Int. Cl.³ .................................................. B65H 35/00
[52] U.S. Cl. ................................ 414/222; 193/31 A; 414/748; 209/703; 209/707
[58] Field of Search ......................... 414/222–225, 414/745, 748, 22, 765, 779, 662, 663, 672; 193/31 A, 17; 248/651, 652, 658, 660, 169; 298/17.6, 17.7; 209/703, 707; 271/299, 302, 303; 83/157, 71; 198/631, 586, 592

[56] References Cited

U.S. PATENT DOCUMENTS

| | | | |
|---|---|---|---|
| 720,212 | 2/1903 | Agnew | 271/299 X |
| 1,852,534 | 4/1932 | Moore | |
| 2,023,700 | 12/1935 | Rodler | 298/17.6 |
| 2,549,560 | 4/1951 | Archer | |
| 3,260,145 | 7/1966 | Giordano | |
| 3,348,678 | 10/1967 | Flowers | 198/592 X |
| 3,349,602 | 10/1967 | Nelson | |
| 3,361,750 | 12/1968 | Hanni | |
| 3,370,493 | 12/1968 | Donley et al. | |
| 3,476,267 | 11/1969 | Clarke | 414/779 |
| 3,555,946 | 1/1971 | Addis | |
| 3,611,453 | 10/1971 | Lokken | 108/8 X |
| 3,866,498 | 2/1975 | Jarman | |
| 3,880,033 | 4/1975 | Taylor | |
| 3,908,980 | 9/1975 | Fowler | |
| 3,964,791 | 6/1976 | Griffis | 298/17.6 X |
| 4,080,855 | 3/1978 | De George et al. | |
| 4,116,097 | 9/1978 | Graham et al. | |
| 4,156,376 | 5/1979 | Benuzzi | |

FOREIGN PATENT DOCUMENTS

| | | | |
|---|---|---|---|
| 525089 | 9/1921 | France | 298/17.6 |
| 213729 | 6/1967 | Sweden | 414/748 |

Primary Examiner—Robert J. Spar
Assistant Examiner—Terrance L. Siemens
Attorney, Agent, or Firm—John O. Graybeal

[57] ABSTRACT

Support and discharge apparatus (10) includes a pair of forward legs (20) which are pinned to the forward edge portion of a rectangularly-shaped table (14) and a pair of rear legs (22) pinned to the rear end portion of the table. Legs (20) and (22) are in turn supported by fluid cylinders (24) and (26) which are pivotally connected to the lower end portions of the legs. When cylinders (24) and (26) are retracted, table (14) is supported in horizontal position. Table (14) is tilted forwardly by extending forward cylinders (24) and maintaining rear cylinders (26) retracted. Alternatively, table (14) is tilted rearwardly by extending rear cylinders (26) and maintaining forward cylinders (24) retracted. When rear cylinders (26) are in retracted positions, rear legs (22) are retained against rotation by spaced apart studs (122) which press against the edges of the legs (22). Correspondingly, when forward cylinders (24) are in retracted positions, forward legs (20) are retained against movement by spaced apart studs (114) which press against a side edge portion of the legs.

58 Claims, 5 Drawing Figures

MACHINE TOOL SUPPORT AND DISCHARGE APPARATUS

DESCRIPTION

1. Field of the Invention

The present invention relates to product handling devices, and more particularly to a support and discharge apparatus especially adopted to be used in conjunction with a machine tool to alternatively support work pieces during operation of the machine tool, direct the completed workpieces either toward the front of the machine tool or rearwardly away from the machine tool.

2. Background Art

In the operation of conventional machine tools, such as sheet metal presses or shears, a workman feeds material or partially completed workpieces into the machine from the front side of the machine. After the bending, forming or shearing or other operation has been completed, the workpiece is discharged at the rear side of the machine to collect on a rearwardly sloping, stationary surface. To retrieve the completed workpiece, the workman must move around to the back side of the machine tool, which is a laborious and time-consuming operation. Also, while the workman is retrieving the completed workpiece, the machine tool generally is not in operation thus reducing its efficiency. On the other hand by the present invention, the completed workpieces may be discharged either rearwardly away from the machine in a conventional manner or forwardly toward the front of the machine. Additionally, the present invention is capable of assisting in supporting large area workpieces while they are being formed or cut, further improving the efficiency of the machine tool.

In the past, devices have been utilized for directing workpieces away from a cutting, bending or other type of machine tool. U.S. Pat. Nos. 4,156,376; 4,080,855; 3,908,980; and 3,631,750 disclose tilting work tables which are positioned horizontally during operation of the machine tool to help support the workpiece and then tilt to discharge the completed workpiece downwardly away from the machine. In each of these patents, the support table pivots about a single transverse axis to direct the discharging workpiece in only a singular direction.

U.S. Pat. No. 1,852,534 concerns a shearing machine constructed with a pair of elongate arms which are cantilevered rearwardly from a transverse shaft to pivot between a horizontal workpiece supporting position and a downwardly tilted workpiece discharge position to direct completed workpieces downwardly and rearwardly away from the bed of the shearing machine. The orientation of the elongate arms are adjusted by manually pivoting the shaft with a hand crank.

The prior art also includes various devices which are tilted to direct completed workpieces away from a machine tool during the upstroke of the machine tool. In U.S. Pat. No. 3,349,602 an inclined tray is slid forwardly beneath a ramhead of a press to receive workpieces, such as automobile brake drums, which are automatically discharged from an upper die of the press after completion of the pressing operation.

In U.S. Pat. No. 2,549,560 a stock supporting and delivery table is pinned to the upper knife support of a shearing machine so that during the upstroke of the knife support, the support table is upwardly tilted to direct completed workpieces away from the shearing machine.

U.S. Pat. No. 3,260,145 discloses a machine tool for shearing plate stock wherein support rollers for supporting the plate stock during the shearing operation are moved relative to each other during the downstroke of the upper shearing blade to thereby direct the sheared plate away from the machine tool into a collection area.

Swingable conveyors have also been used in conjunction with machine tools. In U.S. Pat. No. 4,116,907 a conveyor is constructed as a portion of a four bar link arrangement to enable the conveyor to be swung downwardly out of the way of a fluid jet cutter which cuts the stock material into desired shapes. U.S. Pat. No. 3,370,493 concerns a conveyor which receives workpieces at the entrance end of a machine tool and then conveys them to a first work station. The conveyor may be tilted upwardly or downwardly about a single transverse axis to receive work at various heights.

Various types of pivoting diverters for diverting workpieces or material to different locations are disclosed by U.S. Pat. Nos. 3,880,033; 3,866,498; and 3,760,670. In the '033 patent, a diverter is pivoted by a fluid cylinder to direct corrugated paper board either downwardly onto a conveyor or horizontally onto a work table. In the '498 patent, a diverter plate is pivoted about a transverse axis by a fluid cylinder to raise the plate upwardly to direct scrap material downwardly into a waste car or to direct sheared piece parts onto a conveyor. The '670 patent concerns a tubular directing element which is pivotable about a transverse axis by a pair of air cylinders to direct rolled stock to either a lower by-pass guiding element, an intermediate guiding element or an upper guiding element.

DISCLOSURE OF THE INVENTION

The present invention relates to a double-tilting support and discharge apparatus specifically adapted to be used in conjunction with machine tools alternatively to support workpieces during the operation of the machine tool, to direct workpieces discharged from the machine tool toward the front of the machine tool, or to direct workpieces discharged from the machine tool rearwardly away from the back of the machine tool. The apparatus includes a tiltable, generally planar table having a forward end portion disposed adjacent to the back or rear side of the machine tool and a rearward end portion disposed rearwardly away from the back side of the machine tool. The table is supported by a first set of support legs having upper end portions which are pivotally connected to the forward end of the table at a first upper pivot axis and a second set of support legs having upper end portions which are pivotally connected to the rear end of the table at a second upper pivot axis. The first support legs are supported by linear actuators which are pivotally connected to the lower end portions of the support legs at a first lower pivot axis. Correspondingly, the second support legs are pivotally supported by linear actuators which are pivotally connected to lower end portions of the support legs at a second lower pivot axis. The first and second linear actuators are individually shiftable between retracted and extended positions to pivot and simultaneously translate the first and second support legs between generally upright and generally prone positions, thereby tilting the table about the second and first pivot axes, respectively.

The first support legs are restrained in generally upright position when the first linear actuators are in retracted position. This is accomplished by a pair of spaced apart stop members which bear against adjacent portions of the first support legs. The second support legs are similarly restrained in generally upright position when the second linear actuators are disposed in retracted position.

In the operation of the present invention, to position the table in horizontal orientation, first and second linear actuators are shifted to their retracted positions, thereby disposing the first and second support legs in generally upright position. The table is shifted into forwardly tilted position to direct workpieces toward the front of the machine tool by extending the first linear actuators to swing the first support legs into prone position, thereby pivoting the table about the second upper pivot axis. When in forwardly tilted position, the table is in adjacent alignment with a stationary forward discharge ramp which serves as an extension of the forwardly tilted table. The forward discharge ramp extends beneath the machine tool to terminate near the front of the machine tool. A first lip extends transversely upwardly from the forward end of the discharge ramp to stop workpieces which have slid down the ramp. When the table is disposed in forwardly tilted position, the second linear actuators are held in retracted position to press stop members against the second leg members to retain the second leg members in stationary upright position.

To tilt the table rearwardly to direct workpieces rearwardly away from the machine tool, the first linear actuators are shifted into retracted position and then the second linear actuators are extended to swing the second legs into prone position thereby pivoting the table about the upper end portion of the first leg members, i.e., first upper axis. When the first linear actuators are in such retracted position, stop members press against the first legs to restrain the first legs in generally upright orientation. When the table is tilted rearwardly, it is disposed in adjacent alignment with a correspondingly tilted, stationary rear discharge ramp which serves as an extension of the rearwardly tilted table. The rear discharge ramp includes a lip portion which extends transversely from the lower edge portion of the ramp to serve as a stop for the workpieces which slide down the rear discharge ramp.

It will be appreciated that the above construction results in a very compact structure which may be originally designed as part of a machine tool or retrofitted on an existing machine tool to discharge workpieces forwardly toward the front of the machine tool or rearwardly away from the machine tool as desired.

BRIEF DESCRIPTION OF THE DRAWINGS

The details of one typical embodiment of the present invention will be described in connection with the accompanying drawings, in which.

BEST MODE OF THE INVENTION

Figure 1:
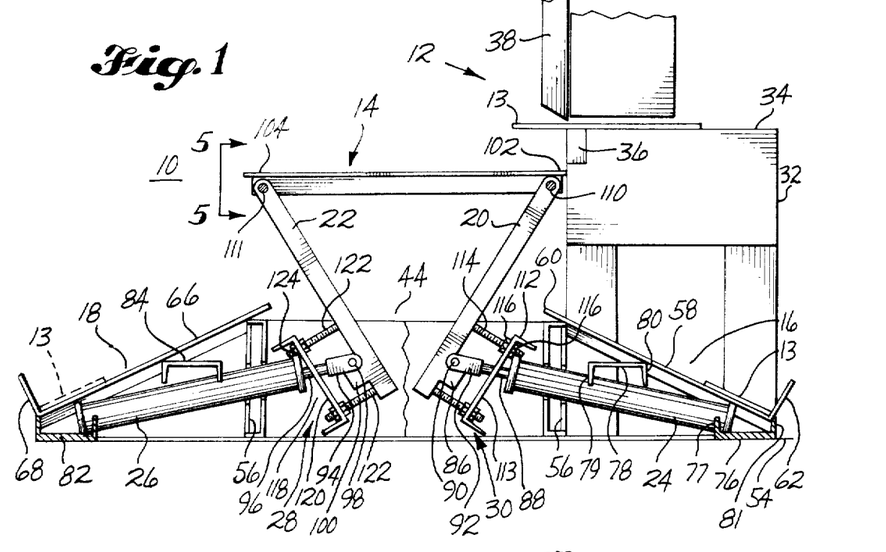
FIG. 1 is a side elevational view of a support and discharge apparatus constructed according to the present invention illustrating the table in horizontal position.
Figure 2:
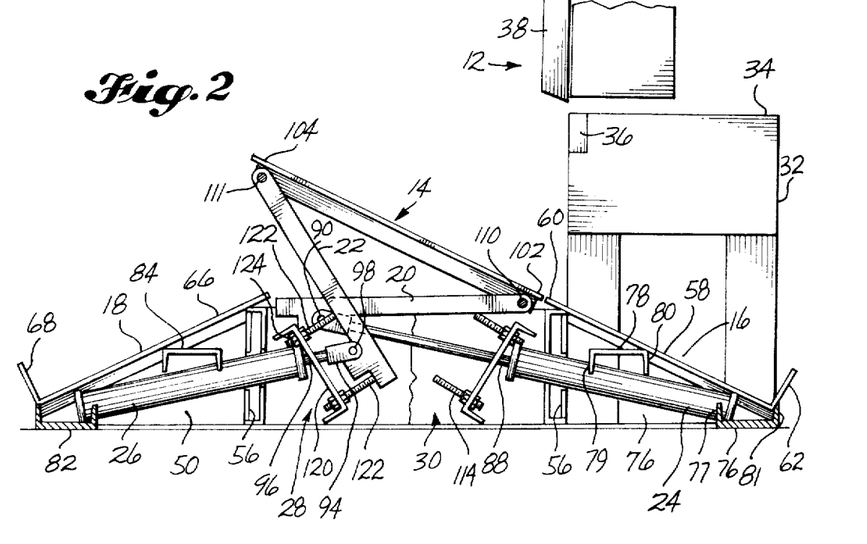
FIG. 2 is a view similar to FIG. 1 illustrating the table in forwardly tilted position.
Figure 3:
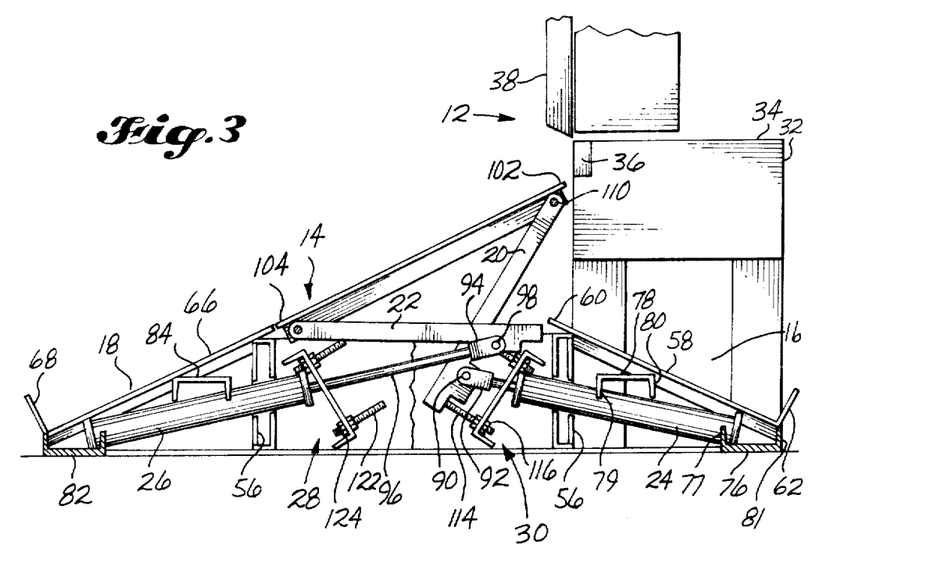
FIG. 3 is a view similar to FIGS. 1 and 2 illustrating the table in rearward tilted position.

Referring initially to FIGS. 1-3, a support and discharge apparatus 10, constructed according to the best mode of the present invention currently known to applicant, is positioned on the rear side of a schematically illustrated machine tool in the form of a shear 12, which is conventional per se and of a type commonly used to bend or shear metal sheets, plates or strips. Support and discharge apparatus 10 includes a table 14, which may be supported in horizontal position as illustrated in FIG. 1, or alternatively tilted about its opposite ends to align with a forwardly sloped front ramp 16 or a rearwardly sloped rear ramp 18. Table 14 is supported by front leg members 20 and rear leg members 22 which are pivotally connected to opposite ends of the table. Legs 20 and 22 are in turn supported by powered linear actuators in the form of front and rear fluid cylinders 24 and 26, respectively, which are pivotally connected to the lower end portions of legs 20 and 22. Front cylinders 24 are shiftable from retracted positions as illustrated in FIG. 1 and extended positions as illustrated in FIG. 2 to thereby tilt table 14 in the forwardly direction toward the front of shear 12. When fluid cylinders 24 are in such extended positions, rear cylinders 26 are maintained in retracted positions and rear legs 22 are retained against rotation by a rear restraining structure 28. Table 14 may be rearwardly tilted by extending rear cylinders 26 from their retracted positions shown in FIG. 1 to their extended positions shown in FIG. 3. When rear cylinders 26 are in such extended positions, front cylinders 24 are disposed in retracted positions and front legs 20 are restrained against rotation by a front restraining structure 30.

Considering the above, briefly described support and discharge apparatus 10 of the present invention in more detail, shear 12 includes a lower section 32 having a horizontal work support surface 34 and a conventional, stationary lower knife 36 secured to the rear side of lower section 32 at an elevation corresponding to the work support surface. Shear 12 also includes an upper, movable knife 38 mounted on an upper portion 40 of the shear. Although not illustrated, upper portion 40 may include a pneumatically-actuated clamp mechanism for holding a workpiece 13 securely against support surface 34 as upper knife 38 descends to cut, bend or otherwise form the workpiece.

Figure 4:
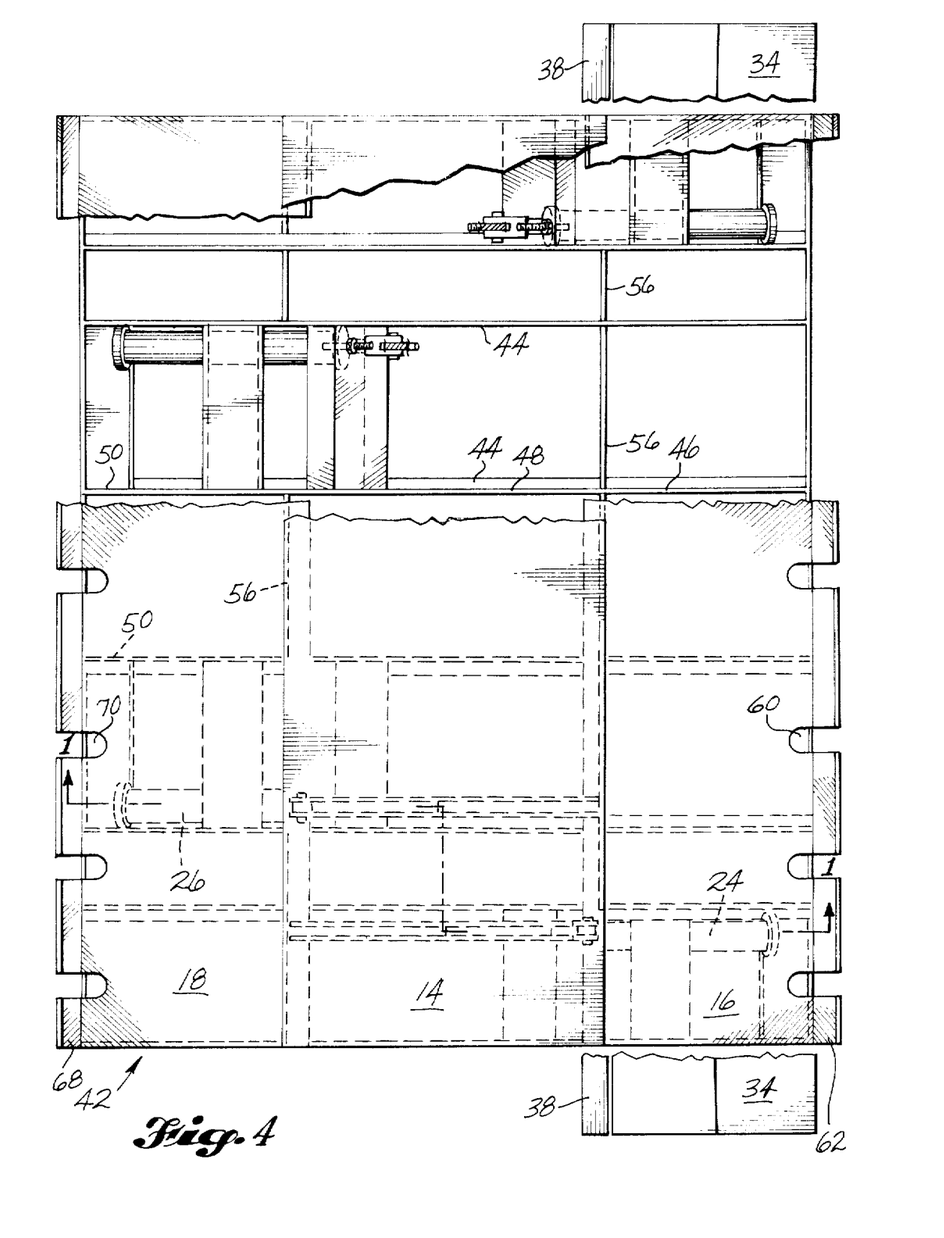
FIG. 4 is a plan view of the present invention with portions broken away to illustrate the internal construction of the tilt table.

Additionally referring to FIG. 4, support and discharge apparatus 10 includes a frame structure 42 for supporting ramps 16 and 18 and fluid cylinders 24 and 26. Frame structure 42 is composed of a plurality of upright, laterally spaced apart longitudinal walls 44 extending along the length of the support and discharge apparatus. Longitudinal walls 44 are formed with a front tapered section 46 disposed beneath horizontal work support surface 34 to terminate adjacent the front side of shear 12, with a rectangularly shaped intermediate portion 48 extending rearwardly from the back side of the shear and a rear tapered section 50 extending rearwardly from intermediate section 48. Preferably, longitudinal walls 44 are disposed parallel to each other and are spaced across the width of the support and discharge apparatus. Flanges 52 extend transversely outwardly from the lower edges of and extend substantially along the entire lengths of walls 44 to engage against the upper surface of floor 54. Frame 42 also includes upright, transverse wall members 56 which interconnect adjacent, longitudinal walls 44 at intermediate locations along the length of the longitudinal walls corresponding to the juncture of wall intermediate portions 48 with wall front tapered sections 46 and wall rear tapered sections 50. Transverse wall members 56 increase the strength and rigidly of frame structure 42.

A front ramp 16 rests on the upper edge portions of the front tapered sections 46 of longitudinal walls 44 and extends beneath support surface 34 of shear 12. Ramp 16 includes a flat discharge surface portion 58 which is sloped downwardly toward the front of shear 12 and extends substantially the full width of frame structure 42. Discharge surface 58 terminates at a rear edge 60 at approximately the location at which wall intermediate sections 48 intersect with wall front tapered sections 46. Ramp 16 also has a transverse front lip portion 62 which extends transversely upwardly from the front edge of discharge surface 58 to act as a stop for workpieces which are discharged in the forward direction by apparatus 10. A plurality of generally U-shaped slots 64 are formed in front lip 62 and discharge surface 58 to enable a workman, FIG. 4, to grasp the front edge of a workpiece which is stopped against the front lip. Preferably discharge surface 58 and front lip 62 are formed from metal decking or similar material. If required, additional braces or gussets may be utilized to reinforce frame structure 42 and front ramp 16 to safely support very heavy workpieces, for instance when the support and discharge apparatus 10 of the present invention is used in conjunction with other types of machine tools, such as a forge. Also, although ramp 16 is illustrated as inclined at an angle of approximately thirty degrees, it may be sloped at other angles depending on the clearance space existing beneath the shear and the ability of the workpieces to slide along the ramp.

Support and discharge apparatus 10 further includes a rear ramp 18 constructed similarly to the above-described front ramp 16. Accordingly, rear ramp 18 has a flat discharge surface 66 secured to the upper edges of rear tapered sections 50 of longitudinal walls 44 to direct workpieces 13 rearwardly away from shear 12. The rear ramp has a rear lip 68 extending transversely upward from the rear edge portion of discharge surface 66 to act as a stop for workpieces 13 which slide downwardly along the discharge surface 66. As with front lip 68, a plurality of U-shaped slots 70 are formed in rear lip 68 and discharge surface 66 to enable a workman to conveniently grasp the adjacent edge portions of workpiece 13 when removing the workpiece from the ramp. Preferably rear ramp 18 also is constructed from metal plate material which may be additionally reinforced to increase its structural rigidity and load carrying capacity. Although rear ramp 18 is illustrated as sloped at an angle equal to but in the opposite direction from the slope of front ramp 16, the rear ramp may be disposed at an angle different than the front ramp without departing from the scope of the present invention.

A pair of laterally spaced apart forward fluid cylinders 24 is located beneath front ramp 16 and directed generally rearwardly away from shear 12. Cylinders 24 are held in upwardly tilted, fixed position by lower channel members 76 positioned below the forward edge of front ramp 16 and spanning between adjacent longitudinal walls 44. Lower channels 76 are disposed with their flanges extending upwardly. A semi-circular slot is formed in flange 77 of the channel members to receive the corresponding end portions of cylinders 24. Cylinders 24 are additionally supported by upper channel members 78 which also span between adjacent longitudinal walls 44 at locations intermediate along the lengths of cylinders 24. Upper channels 78 are disposed with their flanges directed downwardly and semi-circularly shaped slots are formed in flanges 79 of the channel members to receive cylinders 24. Cylinders 24 are secured to channel members 76 and 78 by any convenient means, such as by weldments. Ideally the upper forward corners 80 of upper channels 78 are secured to the underside of ramp 16, for instance by weldments to assist in rigidly securing the upper channel in place. Likewise, ideally the upper edges of forward flanges 81 of lower channels 76 are secured to the underside of ramp 16. It will be appreciated that by the above-described structure, the outer casings of cylinders 24 are securely held against movement.

A pair of rearwardly positioned, generally forwardly directed rear cylinders 26 are located beneath rear ramp 18. Rear cylinders 26 are held in place by lower channels 82 and upper channels 84 corresponding to lower channels 76 and upper channels 78 of forward cylinder 24. Accordingly, the foregoing description of the construction and placement of lower channels 76 and upper channels 78 also applies to channels 82 and 84.

A clevis 92 is attached to the leading end of rod 88 of each cylinder 24 to pivotally interconnect with the lower end portion of a corresponding table forward support leg 20. Each leg is illustrated as constructed in a straight, elongate, generally flat form to interconnect cylinder rod 88 with the front edge portion of table 14. A pin 90 extends through aligned holes formed in clevis 92 and through a clearance hole provided in a lug portion 92 which extends transversely from one side of leg 20. Lug portions 86 provide clearance between the main portion of leg 20 and clevis 92 during forward tilting of table 14. When table 14 is in its nominal, uppermost and horizontal position as illustrated in FIG. 1, leg 20 extends upwardly and forwardly from clevis 92 to intersect with forward edge portion 102 of table 14.

The present invention also includes a pair of table rear support legs 22 corresponding to forward legs 20. The lower ends of rear legs 20 are pivotally attached to a clevis 94 mounted on the leading end of cylinder rod 96 of rear cylinders 26. A lug portion 100 extends transversely from the lower portion of each leg 22 to extend between the jaws of clevis 94. A pin 98 extends through aligned holes provided in the two jaws of the clevis and through a clearance hole provided in lug 100 to pivotally interconnect the lug with the leading end of cylinder rod 96. Although not essential to the present invention, rear legs 22 are preferably constructed identically to forward legs 20. Also, when table 14 is disposed in its nominal horizontal position, FIG. 1, or in its forwardly tilted position, FIG. 2, rear legs 22 extend diagonally upwardly and rearwardly from clevis 94 to interconnect with rear edge portion 104 of table 14.

Figure 5:
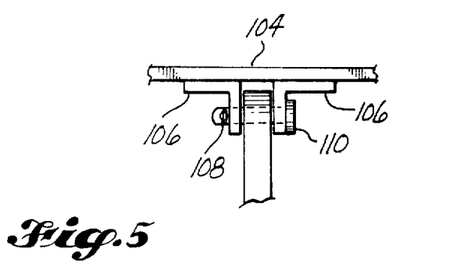
FIG. 5 is an enlarged, fragmentary elevational view of a portion of the apparatus illustrated in FIG. 1, taken substantially along lines 5—5 thereof.

Table 14, as illustrated in FIG. 4, is generally rectangular in shape, is disposed between forward ramp 16 and rearward ramp 18 and extends substantially the full width of apparatus 10. The forward edge 102 of the table is disposed adjacent the rear side of shear 12. Table 14 is constructed with a flat top surface 104 and pairs of angle-shaped reinforcing members 106 extending longitudinally along the length of the table. As best illustrated in FIG. 5, reinforcing members 106 are spaced apart a distance sufficient to receive the upper end portions of legs 20 and 22 therebetween. Members 106 may be fixed to the underside of table top surface 104 by any convenient means, such as by rivets, bolts or weldments. The upper ends of legs 20 and 22 are pivotally joined to the forward and rearward end portions 102 and 104, respectively, of table 14 by cross pins 110 and 111, respectively, which extend through aligned holes provided in retaining members 106 and through a clearance hole formed in the upper end portions of legs 20 and 22. A suitable retainer, such as a cotter key 108 may be inserted through a cross hole drilled through the leading ends of pins 110 and 111 to prevent the pins from becoming disengaged from the retaining members. Brace members 106 may be utilized at other locations in addition to the locations of cylinders 22 and 26 to thereby increase the structural integrity and the load carrying capacity of table 14.

As illustrated in FIGS. 1-3, front restraining structures 30 cooperate with forward cylinders 24 to maintain forward legs 20 in generally upright positions when the cylinders are retracted. Correspondingly, rear restraining structures 28 cooperate with rear fluid cylinders 26 to restrain rear legs 22 against rotation or other movement from their generally upright position as illustrated in FIGS. 1 and 2 when the rear cylinders are disposed in their retracted positions. In preferred embodiment, forward retaining structures 30 include a channel-shaped member 112 spanning between the adjacent longitudinal walls 44 located on each side of forward cylinders 24. The web portion 113 of the channel member is preferably tilted at an angle parallel to the angle of forward legs 20 when the legs are disposed in their generally upright position. A clearance opening is provided in web portion 113 to permit free extension and retraction of cylinder rod 88. A pair of stop members in the form of studs 114 extend transversely from channel members 112 to abut against the adjacent side edge portion of legs 20 to restrain the legs against movement when cylinder 24 is retracted. Studs 114 are spaced apart from each other a distance substantially equal to the full height of channel web portion 113. Studs 114 are secured to channel member 112 by a pair of nuts 116 threadably engaged with the studs on opposite sides of web 113. The engagement of nuts 115 with studs 114 may be adjusted to thereby vary the standout of the studs to in that manner selectively adjust the angular orientation assumed by legs 20 when cylinder 24 is disposed in retracted position.

Rear restraining structures 28, constructed similarly to front restraining structures 30, cooperate with rear cylinders 26 to maintain rear support legs 22 in generally upright positions when the rear cylinders are retracted, FIGS. 1 and 2. Accordingly, rear restraining structures 28 include a channel member 118 spanning between the longitudinal walls 44 located on each side of rear cylinders 26 and angularly disposed so that web portions 120 of the channel members are aligned substantially parallel with legs 20 when the legs are positioned generally upright as illustrated in FIGS. 1 and 2. Rear restraining structures 28 also include adjustable stop members in the form of a pair of studs 122 which extend transversely from channel webs 120 to abut against the adjacent edge portion of rear legs 22 when rear cylinders 26 are disposed in retracted position.

Studs 122 are adjustably held in place by nuts 124 disposed on the opposite sides of channel webs 120. The engagement of nuts 124 along the length of studs 122 may be altered to vary the standout of the studs to thereby selectively adjust the angular orientation of rear legs 22 when cylinders 26 are retracted. When cylinders 26 are extended, as illustrated in FIG. 3, rear legs 22 are spaced away from studs 122.

In operation, table 14 may be shifted from a horizontal position, as illustrated in FIG. 1, to a forwardly tilted position, as illustrated in FIG. 2, or a rearwardly tilted position as illustrated in FIG. 3. When in horizontal position, table 14 can function to receive short, cut workpieces or to help support larger area workpieces while they are being formed or cut by shear 12. When disposed in forwardly tilted position, as illustrated in FIG. 2, table 14 directs workpieces 13 discharged from shear 12 forwardly toward the front of the shear. The workpieces initially fall downwardly onto the table and then slide forwardly along ramp 16 to stop against front lip 62. The workpieces may then be conveniently retrieved by the workman without having to walk to the rear of the shear. When tilted in rearward position, as illustrated in FIG. 3, workpieces 13 discharged from the shear initially fall downwardly onto table 14 and then slide rearwardly along rear ramp 18. It may be desirable to direct the workpieces rearwardly away from the back side of the shear, for instance, when the workpieces are transferred to the next work station by someone other than the operator of the shear 12.

Table 14 is shifted between the above-described three positions simply by extension and retraction movement of cylinders 24 and 26. To position table 14 in the horizontal position illustrated in FIG. 1, cylinders 24 and 26 are fully retracted thereby forcing forward legs 20 against studs 114 and rearward legs 22 against studs 122 to prevent rotation or other movement of the forward and rearward legs. Table 14 is shifted into forward tilting position, FIG. 2, by extending cylinders 24 to swing legs 20 into a substantially horizontal orientation and simultaneously pivoting table 14 about pins 111. It will be appreciated that during extension of cylinders 24, forward legs 20 pivot about pins 110, which pins travel along arcuate paths centered about pin 111. Also, during extension of cylinder 24, pins 90 of clevises 92 simply travel in straight line paths along the lengths of cylinder rods 88 and rear legs 22 are restrained against rotation or other movement by restraining structures 28.

To return table 14 to the horizontal orientation illustrated in FIG. 1, cylinders 24 are simply retracted. To tilt the table rearwardly to the position illustrated in FIG. 3, rear cylinder 26 is extended thereby swinging rear leg 22 about pin 111 which in turn causes table 14 to pivot about pin 110. During the rearward tilting of table 14, front legs 20 are restrained in generally upright positions by forward restraining structures 30. As during the forward tilting of table 14, when the table is tilted rearwardly, rear legs 22 swing about pins 111, which pins simultaneously travel along arcs centered about pins 110. Also, during movement of rearward legs 22, pin 98, engaged with clevises 94, travel along linear paths aligned with the lengths of cylinder rods 96. To return table 14 to its horizontal position, cylinders 26 are simply retracted.

It will be appreciated that constructing apparatus 10 in the manner described above results in a rugged but compact, low height design that enables forward ramp 16 to be placed beneath most common machine tools, such as shear 12. Also, by placing cylinders 24 and 26 beneath ramp 16 and 18, the cylinders and support legs 20 and 22 are located out of the way of workmen thereby reducing the possibility that the workmen may be injured by the moving components of apparatus 10. Moreover, the present invention utilizes commonly available structural components which do not require extensive fabrication. In addition, tilting movement of table 14 is achieved simply by extension and retraction of fluid cylinders 24 and 26.

It will be further appreciated that to accommodate different applications, ramps 16 and 18 may be positioned at angles different than illustrated in FIGS. 1–3, and the stroke and position of cylinders 24 and 26 and the length of legs 20 and 22 may be varied to adopt to any changes in the slopes of the ramps. Also, the position and stroke of cylinders 24 and 26 and the lengths of legs 20 and 22 may be changed to adjust to changes in the length of table 14. Moreover, rather than being disposed in horizontal position when cylinders 24 and 26 are fully retracted, table 14 may be nominally sloped either rearwardly or forwardly, for instance to discharge workpieces at two different rearward or forward locations.

As will be apparent to those skilled in the art to which the invention is addressed, the present invention may be embodied in forms other than that specifically disclosed above without departing from the spirit or essential characteristics of the invention. The particular embodiment of the support and discharge apparatus 10, as described above, is therefore to be considered in all respects as illustrative and not restrictive, with the scope of the present invention being set forth in the appended claims rather than being limited to the foregoing description.

What is claimed:

1. In combination with a machine tool, a support and discharge apparatus, comprising:
   (a) a table having a first end portion disposed adjacent one side of the machine tool and a second end portion disposed away from the machine tool; and
   (b) support/pivot means for alternatively supporting said table in horizontal position, pivoting said table about its second end portion into a first tilted position to direct workpieces discharged from the machine tool in a direction toward the side of the machine tool opposite said table, or pivoting said table about its first end portion into a second tilted position to direct workpieces discharged from said machine tool in a direction away from the machine tool, wherein said support/pivot means comprises:
      (1) a first leg means having upper end portions pivotally connected to the first end portion of said table;
      (2) first actuator/support means pivotally connected to the lower end portion of said first leg means and shiftable between first and second positions to pivot said table between horizontal and first tilted positions, respectively;
      (3) first retaining means cooperating with said first actuator/support means for retaining said first leg means in fixed position when said first actuator/support means is in first position;
      (4) second leg means having upper end portions pivotally connected to the second end portion of said table;
      (5) second actuator/support means pivotally connected to the lower end portion of said second leg means and shiftable between first and second positions to pivot said table between horizontal and second tilted positions, respectively, and;
      (6) second retaining means cooperating with said second actuator/support means for retaining said second leg means in fixed position when said second actuator/support means is in first position.

2. The combination according to claim 1, wherein:
   when said table is disposed in said first tilted position, said table is tilted downwardly toward the machine tool; and
   when said table is disposed in said second tilted position, said table is tilted downwardly away from the machine tool.

3. The combination according to claim 1, wherein:
   said second retaining means retain said second leg means in fixed position during shifting movement of said first actuator/support means between first and second positions; and
   said first retaining means retain said first leg means in fixed position during shifting movement of said second actuator/support means between first and second positions.

4. The combination according to claim 1, wherein said first actuator/support means comprises a first linear actuator pivotally attached to the lower end portion of first leg means about a first lower axis, and said first linear actuator is shiftable between a first, retracted position and a second, extended position to move said first lower axis along a linear path.

5. The combination according to claim 4, wherein said linear actuator is retained in fixed orientation.

6. The combination according to claim 1, wherein said second actuator/support means comprises a second linear actuator pivotally attached to the lower end portion of said second leg means about a second lower axis, said second linear actuator shiftabe between a first, retracted position and a second, extended position to move said second lower axis along a linear path.

7. The combination according to claim 6, wherein said second linear actuator is retained in fixed orientation.

8. The combination according to claim 1, wherein said first retaining means comprises a plurality of spaced apart stop members positioned to abut against said first leg means when said first actuator/support means is in first position.

9. The combination according to claim 1, wherein said second retaining means comprises a plurality of spaced apart stop members positioned to abut against said second leg means when said second actuator/support means is in first position.

10. The combination according to claim 1, wherein said first actuator/support means comprises a first fluid cylinder pinned to the lower end of said first leg means at a first lower axis, said first fluid cylinder shiftable between a first, retracted position and a second, extended position to thereby move said first lower axis about a straight line path.

11. The combination according to claim 1, wherein said second actuator/support means comprises a second fluid cylinder pinned to the lower end portion of said second leg means about a second lower axis, said second fluid cylinder shiftable between a first, retracted position and a second extended position to thereby move said second lower axis about a straight line path.

12. The combination according to claim 1, further comprising a first table extension disposed in tilted alignment with said table when said table is disposed in first tilted position.

13. The combination according to claim 12, wherein said first actuator/support means is disposed substantially below said first table extension.

14. The combination according to claim 12, further comprising a second table extension disposed in tilted alignment with said table when said table is disposed in second tilted position.

15. The combination according to claim 14, wherein said second actuator/support means is disposed substantially beneath said second table extension.

16. The combination according to claim 1, further comprising a first table extension disposed in tilted alignment with said table when said table is disposed in first tilted position.

17. The combination according to claim 16, wherein said first table extension is at least partially disposed beneath said machine tool.

18. The combination according to claim 16, further comprising a second table extension disposed in tilted alignment with said table when said table is disposed in second tilted position.

19. A double tilting support and discharge apparatus, comprising:
   (a) a table portion;
   (b) first support leg means having an upper end portion pivotally connected to said table portion at a first pivot axis;
   (c) second support leg means having an upper end portion pivotally connected to said table portion at a second pivot axis spaced from said first pivot axis;
   (d) first actuator means pivotally supporting the lower end portion of said first leg means, said first actuator means pivoting said table portion about said second axis by shifting said first actuator means between a retracted position and an extended position;
   (e) first retaining means for maintaining said second support leg means in fixed position during actuation of said first actuator means;
   (f) second actuator means pivotally supporting the lower end portion of said second leg means, said second actuator means pivoting said table portion about said first pivot axis by shifting said second actuator means between a retracted position and an extended position; and
   (g) second retaining means for maintaining said first support leg means in fixed retracted position during actuation of said second actuator means.

20. The apparatus according to claim 19, wherein said first and second pivot axes are on opposite ends of said table portion.

21. The apparatus according to claim 19, wherein when said first actuator means is in extended position, said table portion is tilted downwardly from said second pivot axis.

22. The apparatus according to claim 19, wherein when said second actuator means is in extended position, said table portion is tilted downwardly from said first pivot axis.

23. The apparatus according to claim 19, wherein said first retaining means includes spaced apart stop members which abut against said first support leg means when said first actuator means are in retracted position to prevent movement of said first support leg means.

24. The apparatus according to claim 19, wherein said second retaining means includes spaced apart stop members which abut against said second support leg means when said second actuator means are in retracted position to prevent movement of said second support leg means.

25. The apparatus according to claim 19, wherein said first actuator means includes a linear actuator which moves the lower end portion of said first support leg means along a linear path thereby causing said first support leg to simultaneously translate and pivot about said first pivot axis when pivoting said table portion about said second pivot axis.

26. The apparatus according to claim 19, wherein said second actuator means includes a second linear actuator which moves the lower end portion of said second support leg means along a linear path thereby causing said second support leg to simultaneously translate and pivot about said second pivot axis when pivoting said table portion about said first pivot axis.

27. The apparatus according to claim 19, wherein when both first and second actuator means are in their respective retracted positions, said table portion is disposed generally horizontally.

28. The apparatus according to claim 19, further comprising a first discharge ramp disposed adjacent to and in tilted alignment with said table portion when said table portion is tilted about said second pivot axis.

29. The apparatus according to claim 28, further comprising a second discharge ramp disposed adjacent to and in tilted alignment with said table portion when said table portion is tilted about said first pivot axis.

30. The apparatus according to claim 19, wherein:
   said table portion includes a forward end and a rearward end;
   said first pivot axis is disposed generally along said table portion forward end; and
   said second pivot axis is disposed generally along said rearward end.

31. The apparatus according to claim 30, wherein said first support leg means includes a plurality of first leg members spaced across the forward end of said table portion to pivot about said first axis.

32. The apparatus according to claim 30 or 31, wherein said second support leg means includes a plurality of second leg members spaced across the rearward end of said table portion to pivot about said second axis.

33. For use with a machine tool, an oppositely tiltable support and discharge apparatus for alternatively supporting a workpiece or alternatively discharging the workpiece toward the front or rear of the machine tool, comprising:
   (a) a table having a first end portion disposed toward the machine tool and a second end portion disposed away from the machine tool;
   (b) first downwardly depending support linkage having its upper end portion pivotally connected to the first end portion of said table portion at a first pivot axis;
   (c) first retaining means for retaining said first support link in a particular fixed position;
   (d) second downwardly depending support linkage having its upper end portion pivotally connected to the second end portion of said table at a second pivot axis;

(e) second retaining means for retaining said second support linkage in a particular fixed position;

(f) first powered means pivotally supporting the lower end portion of said first support linkage, with said second support linkage held in fixed position by said second retaining means, said first powered means extendable and retractable to pivot said table about said second pivot axis between a first position tilted forwardly toward said machine tool and a second position, respectively; and (g) second powered means pivotally supporting the lower end portion of said second support linkage, with said first support linkage held in fixed position by said first retaining means, said second powered means extendable and retractable to pivot said table about said first pivot axis between a first position tilted rearwardly away from the machine tool and a second position, respectively.

34. The apparatus according to claim 33, wherein said first retaining means includes a pair of spaced apart stop members which abut against said first support linkage when said first powered means is in retracted position to prevent movement of said first support linkage during pivoting movement of said table about said second pivot axis.

35. The apparatus according to claim 34, wherein said first support linkage is pressed against said first stop members by said first powered means to prevent movement of said first support linkage when said first powered means is disposed in retracted position.

36. The apparatus according to claim 33, wherein said second retaining means includes a pair of spaced apart stop members which abut against said second support linkage when said second powered means is in retracted position to prevent movement of said second support linkage during pivoting movement of said table about said first pivot axis.

37. The apparatus according to claim 36, wherein said second support linkage is pressed against said stop members by said second powered means when in retracted position to prevent movement of said second support linkage.

38. The apparatus according to claim 33, wherein said first powered means is pivotally interconnected with the lower end portion of said first support linkage about a first lower pivot axis, said first lower pivot axis moving along a linear path during extension and retraction of said first powered means.

39. The apparatus according to claim 33, wherein said second powered means is pivotally connected to the lower end of said second support linkage about a second lower pivot axis, said second lower pivot axis moving along a linear path during extension and retraction of said second powered means.

40. The apparatus according to claim 33, wherein when said first and second powered means are in retracted position, said table is supported in generally horizontal orientation by said first and second support linkage.

41. The apparatus according to claim 33, further comprising a forward discharge ramp disposed adjacent to and in tilted alignment with said table first end portion when said table is tilted forwardly towards the machine tool.

42. The apparatus according to claim 41, wherein said first discharge ramp is at least partially disposed beneath portions of the machine tool.

43. The apparatus according to claim 42, wherein said first discharge ramp terminates at a location adjacent the front of the machine tool.

44. The apparatus according to claim 42, wherein said first discharge ramp includes a stop member extending transversely from the plane of the ramp to stop workpieces sliding down said forward discharge ramp.

45. The apparatus according to claim 41, further comprising a second discharge ramp positioned adjacent to the second end portion of the table and disposed in tilted alignment with said table when said table is tilted rearwardly away from the machine tool.

46. The apparatus according to claim 45, wherein said discharge ramp includes a stop member extending transversely from the plane of said discharge ramp to stop workpieces which slide downwardly on said second discharge ramp.

47. A double tilting support and discharge apparatus, comprising:

(a) a table portion;

(b) first support leg means having an upper end portion pivotally connected to said table portion at a first pivot axis;

(c) second support leg means having an upper end portion pivotally connected to said table portion at a second pivot axis spaced from said first pivot axis;

(d) first actuator means pivotally supporting the lower end portion of said first leg means, said first acutator means pivoting said table portion about said second axis by shifting said first actuator means between a retracted position and an extended position; and (e) second actuator means pivotally supporting the lower end portion of said second leg means, said second actuator means pivoting said table portion about said first pivot axis by shifting said second actuator means between a retracted position and an extended position.

48. The apparatus according to claim 47, wherein said first and second pivot axes are on opposite ends of said table portion.

49. The apparatus according to claim 47, wherein when said first actuator means is in extended position, said table portion is tilted downwardly from said second pivot axis.

50. The apparatus according to claim 47, wherein when said second actuator means is in extended position, said table portion is tilted downwardly from said first pivot axis.

51. The apparatus according to claim 47, wherein said first actuator means includes a linear actuator which moves the lower end portion of said first support leg means along a linear path thereby causing said first support leg to simultaneously translate and pivot about said first pivot axis when pivoting said table portion about said second pivot axis.

52. The apparatus according to claim 47, wherein said second actuator means includes a second linear actuator which moves the lower end portion of said second support leg means along a linear path thereby causing said second support leg to simultaneously translate and pivot about said second pivot axis when pivoting said table portion about said first pivot axis.

53. The apparatus according to claim 47, wherein when both first and second actuator means are in their respective retracted positions, said table portion is disposed generally horizontally.

54. The apparatus according to claim 47, further comprising a first discharge ramp disposed adjacent to and in tilted alignment with said table portion when said table portion is tilted about said second pivot axis.

55. The apparatus according to claim 47, further comprising a second discharge ramp disposed adjacent to and in tilted alignment with said table portion when said table portion is tilted about said first pivot axis.

56. The apparatus according to claim 47, wherein:
said table portion includes a forward end and a rearward end;
said first pivot axis is disposed generally along said table portion forward end; and
said second pivot axis is disposed generally along said rearward end.

57. The apparatus according to claim 56, wherein said first support leg means includes a plurality of first leg members spaced across the forward end of said table portion to pivot about said first axis.

58. The apparatus according to claim 56, wherein said second support leg means includes a plurality of second leg members spaced across the rearward end of said table portion to pivot about said second axis.

* * * * *